United States Patent [19]
Schuh

[11] 4,096,737
[45] Jun. 27, 1978

[54] UNDERWATER WELLHEAD TESTING

[75] Inventor: Frank J. Schuh, Dallas, Tex.

[73] Assignee: Atlantic Richfield Company, Los Angeles, Calif.

[21] Appl. No.: 848,835

[22] Filed: Nov. 7, 1977

[51] Int. Cl.² .............................................. G01M 3/14
[52] U.S. Cl. ......................................... 73/46; 73/151
[58] Field of Search .................. 73/151, 40.5 R, 49.5, 73/49.1, 46; 166/250

[56] References Cited
U.S. PATENT DOCUMENTS

| 3,872,713 | 3/1975 | Ilfrey et al. | 73/151 X |
|---|---|---|---|
| 4,018,276 | 4/1977 | Bode | 73/40.5 R X |

Primary Examiner—Jerry W. Myracle
Attorney, Agent, or Firm—Roderick W. MacDonald

[57] ABSTRACT

A method and apparatus for testing a packoff in an underwater wellhead to a pressure above the normal internal pressure of the casing wherein the packoff is between the casing hanger and the wellhead, the testing being conducted so that should the packoff leak, the casing supported by the casing hanger will not be pressured to its collapse point, the method and apparatus of this invention employing the process steps and devices for maintaining the pressure on the inside of the casing elevated relative to the pressure outside the casing so that the differential pressure across the casing does not exceed the collapse rating of the casing and at the same time maintaining the internal pressure of the casing below the burst rating of that casing.

5 Claims, 3 Drawing Figures

UNDERWATER WELLHEAD TESTING

BACKGROUND OF THE INVENTION

In an underwater wellhead, i.e., a wellhead physically located at or very near the sea floor, a casing hanger supported in the wellhead, the casing hanger in turn supporting casing which extends below the hanger down into the wellbore. A packoff is emplaced between the casing hanger and the wellhead as a pressure seal and after emplacement is pressure tested to determine if it will leak or not.

A long time problem with underwater wellheads has been the problem of how to pressure test the packoff to an adequate pressure without collapsing the casing which extends below the casing hanger if the packoff does leak.

In a conventional packoff pressure test a test tool is landed on the packoff to provide a seal between the drilling string and the casing hanger. The blow out preventer pipe ram is closed on the drilling string and test pressure is applied to the annular space below the pipe ram and above the packoff. If the test tool leaks, fluid returns will be received out of the top of the drilling string under normal conditions. If the packoff does not leak, which is the case in the great majority of situations, no problem is encountered with test pressures up to the working pressure of the wellhead, such test pressures being above the collapse point of the casing. However, if the packoff leaks and the annulus below the packoff is nearly full of cement, cement from prior cementing procedures, the casing below the hanger could be pressured beyond its collapse point as the packoff pressure testing increases up to the working pressure of the wellhead.

The primary safeguard now in use to guard against packoff leakage and casing collapse is to increase the packoff test pressure in stages starting with a pressure safely below the collapse pressure of the casing and monitoring the quantity of drilling fluid required to compress the drilling fluid in the wellhead choke line and annular test space above the packoff. If the low pressure test fails, a higher pressure is unnecessary. However, if the volume required to compress the test fluid is unusually large even though it holds a low test pressure, it could be judged that the packoff is leaking. However, if the top of the cement in the annulus is near the packoff, the volume test may not appear any different than a test of a good packoff and the casing could then be collapsed as further packoff testing, i.e., increase pressurization up to the working pressure of the wellhead, is carried out.

SUMMARY OF THE INVENTION

According to this invention method steps and devices are employed which pressurize the interior of the casing so that should the packoff leak, the increased test pressure outside the casing will not exceed the collapse rating for the casing and at the same time maintains the pressure inside the casing below the burst rating of that casing.

Thus, if the packoff does leak and the pressure outside the casing increases, the pressure inside the casing will also increase so that the differential pressure across the casing never reaches the collapse rating of the casing. At the same time the interior pressurization of the casing is controlled so that the pressure inside the casing does not ever exceed the burst rating of the casing which is a necessary control if the packoff does not leak since in such a situation the pressure outside the casing will not be elevated as it would in the case with the packoff leaking.

Accordingly, it is an object of this invention to provide a new and improved method and apparatus for pressure testing a packoff in an underwater wellhead.

Other aspects, objects and advantages of this invention will be apparent to those skilled in the art from this disclosure and the appended claims.

DETAILED DESCRIPTION OF THE INVENTION

Figure 1:
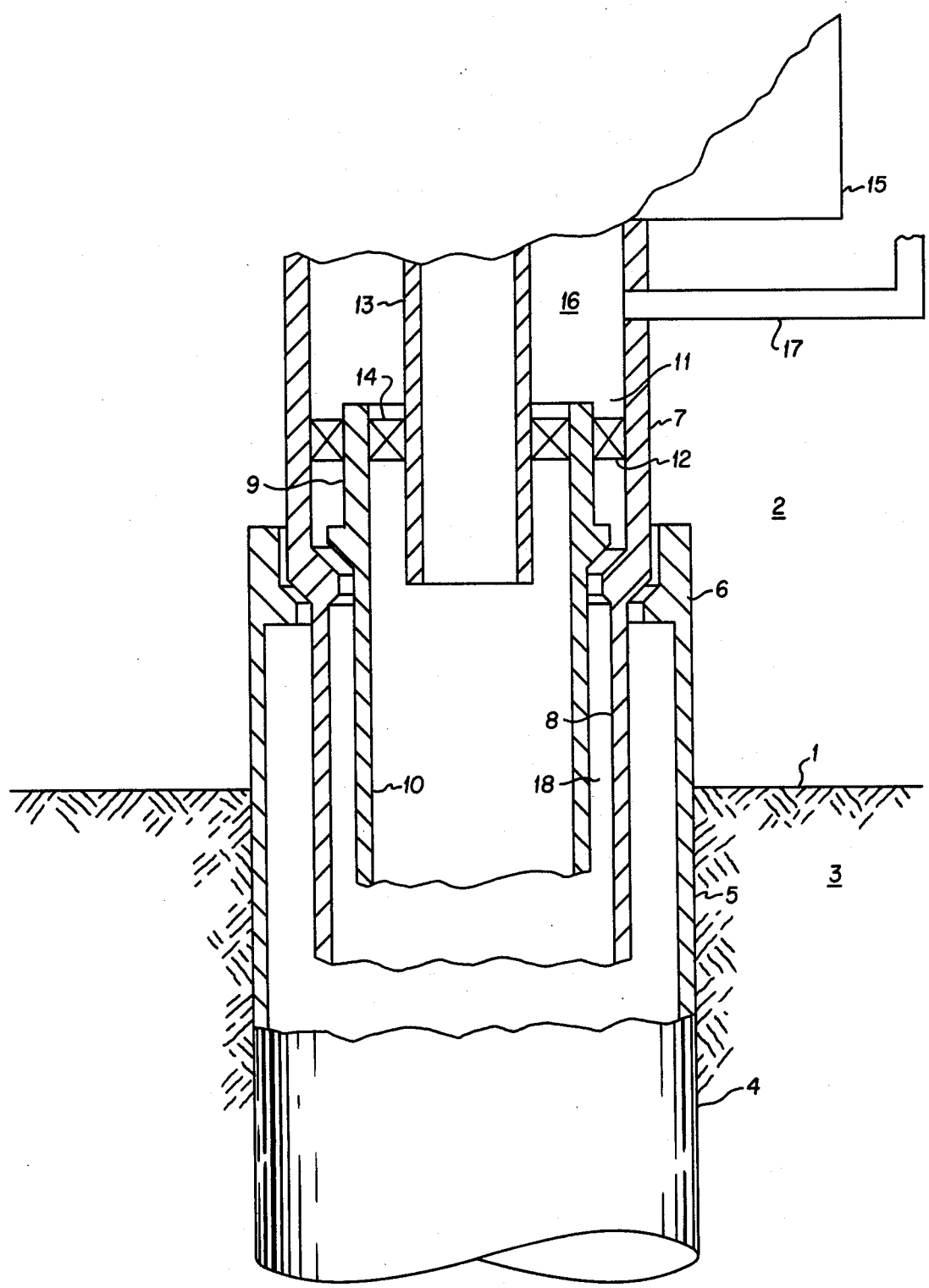
FIG. 1 shows a cross section of an underwater wellhead in place on the ocean floor.

More specifically, FIG. 1 shows ocean floor 1 above which extends sea water 2 and below which is earth 3 in which wellbore 4 has been drilled. In wellbore 4 there has been cemented surface casing 5, typically 30 inch casing. Casing 5 has at its upper end adapter means 6 which receives and supports underwater wellhead 7 which typically has a 10,000 psi working pressure. Wellhead 7 supports therebelow casing 8 which is typically 20 inch casing. Wellhead 7 receives and supports casing hanger 9 and casing hanger 9 supports therebelow casing 10 which is typically 13⅜ inch casing. In annulus 11 between the interior wellhead 7 and the exterior of casing hanger 9 there is placed packoff 12 which seals annulus 11. Drill string 13 extends from the drilling rig floating on the surface of the ocean down through the wellhead and into the interior of casing hanger 9. In order to test whether packoff 12 has sealed correctly and will hold the working pressure of wellhead 7, a conventional packoff pressure test tool 14 is landed to provide a seal between the outside of drilling string 13 and the inside of casing hanger 9.

Thereafter in the conventional test, a blow out preventer pipe ram is closed on drilling string 13 as shown in greater detail in FIG. 2 hereinafter, so that the annulus below blow out preventer 15 and above packoff 12 and tool 14, i.e., annulus 16, can be pressured up to the working pressure of wellhead 7 or to some pressure greater than the design wellhead burst pressure in order to test packoff 12, the pressurization being supplied by a pressurized fluid pumped from the drilling rig to annulus 16 by way of choke line 17.

Thus, in FIG. 1 if annulus 16 is pressurized and packoff 12 holds, there is no problem in pressurized fluid getting past packoff 12 down into annulus 18, which annulus is between the interior of casing 8 and the exterior of casing 10.

However, if packoff 12 does leak, pressurized fluid will reach annulus 18 and should there be cement in annulus 18, such as from a prior cementing job, the pressure buildup in annulus 18 could reach or exceed the collapse rating of casing 10 since the working pressure of wellhead 7 is substantially above the collapse rating of casing 10.

Figure 2:
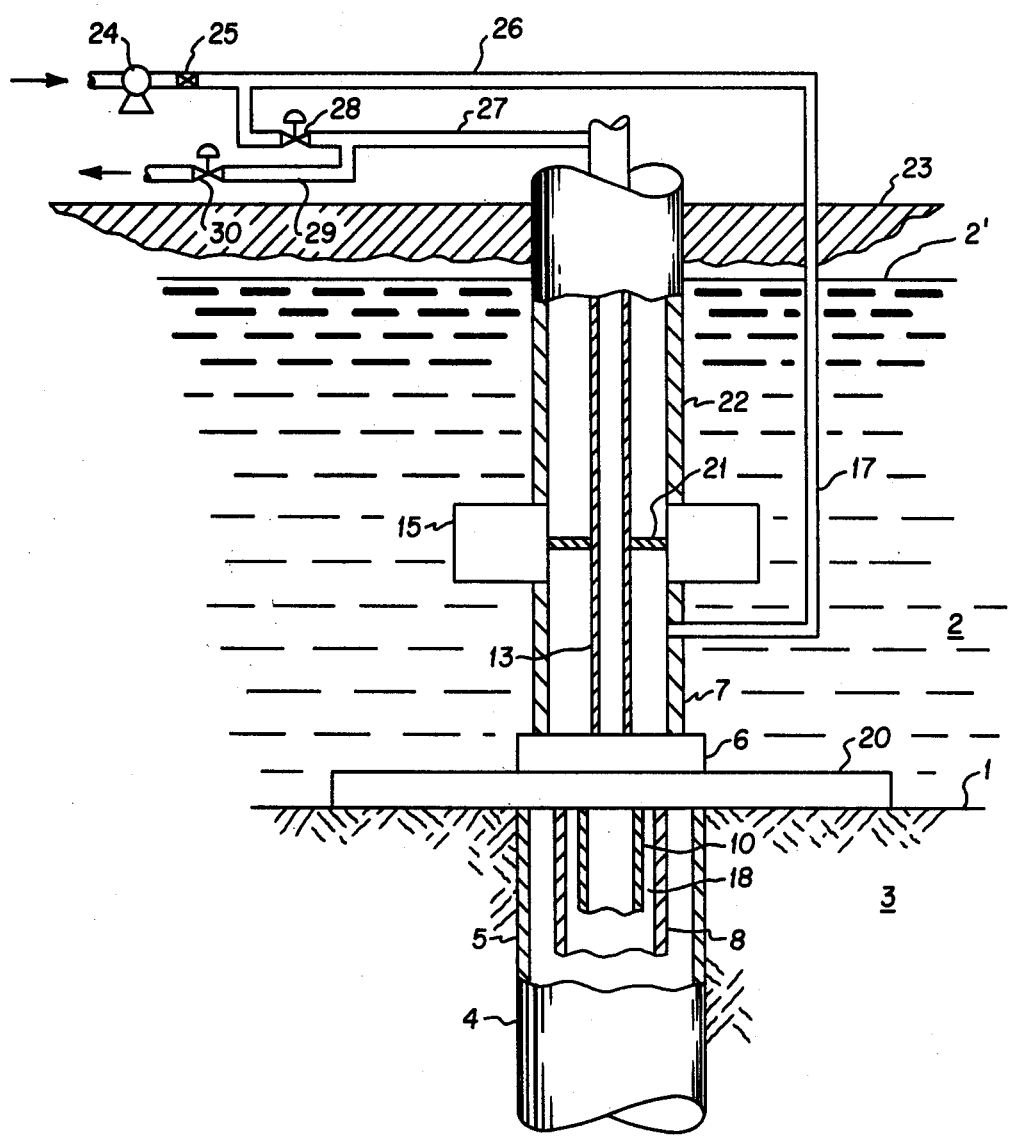
FIG. 2 shows an elevated cross section of the wellhead of FIG. 1 with additional apparatus extending up to the surface of the ocean.

FIG. 2 shows the apparatus of FIG. 1 including that apparatus which reaches to and above the ocean surface to prime. More specifically, resting on ocean floor 1 is a landing base or support means 20 above which extends oil head 7 and blow out preventer 15. FIG. 2 shows pipe rams 21 and blow out preventer 15 close around drilling string 13 as would be their position during pressure testing of packoff 12. FIG. 2 also shows conventional riser 22 extending from above blow out preventer 15 to drilling rig working floor 23.

There is also shown in FIG. 2 a test pump 24 which is connected through choke 25 to choke pipe 17 by way of pipe 26 and to the interior of drilling string 13 by way of pipe 27. Pipe 27, in this embodiment of the invention, carries a differential pressure regulator 28.

The interior of drilling string 13 is also connected to a drilling fluid storage means (not shown) by way of pipes 27 and 29, pipe 29 also containing a pressure regulator 30.

The embodiment of this invention represented by FIG. 2 is best represented by an example where casing 10 is typical 13⅜ inch casing which has an American Petroleum Institute collapse rating of 1950 pounds per square inch (psi) and a burst rating of 3450 psi, this casing like all other circular pipe being more resistant to bursting from internal pressurization than resistant to collapse from external pressurization. Thus, for casing 10 in this example, simultaneous safe test pressures would be 3000 psi burst and 4500 psi above packoff 11 in annulus 16 (which is well within the working pressure of wellhead 7). Thus, if packoff 12 should fail under these conditions, 4500 psi fluid would leak into annulus 18 which would be considerably above the collapse pressure of casing 10 since under normal testing procedures the interior pressure of casing 10 would be well below 1950 psi less than 4500 psi. Also, it should be noted that 4500 psi comfortably exceeds the American Petroleum Institute burst rating for casing 10.

By following this invention, differential pressure regulator 28 would be set to maintain a 1500 psi differential pressure between the interior of choke line 17 and the interior of drilling string 13 so that should packoff 12 leak and thereby pressure annulus 18 to 4500 psi, the interior of casing 10 by way of drilling string 13 will already be pressured to 3000 psi thereby maintaining a differential pressure across casing 10 of 1500 psi which is well within the 1950 psi American Petroleum Institute collapse rating for this casing. This way, packoff 12 can be pressure tested at beyond the collapse rating of casing 10 and without fear of collapsing casing 10 should packoff 12 leak. Further, in accordance with this invention, pressure regulator 30 would be set at 3000 psi to prevent casing burst if the interior of casing 10 should be pressurized such as by way of a leaking test tool 14. To recap, differential regulator 28 is set to automatically protect casing 10 from collapse if packoff 12 leaks and pressure regulator 30 is set to automatically protect casing 10 from bursting pressure if test tool 14 leaks.

Figure 3:
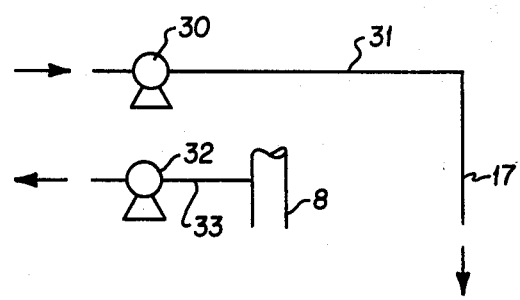

It will be readily apparent to one skilled in the art that other combinations of apparatus can be employed to achieve the results of this invention. For example, as shown in FIG. 3, two pumps can be employed instead of the pressure regulators of FIG. 2, pump 30 supplying by way of pipe 31 pressurized fluid to choke line 17 much the way pump 24 supplied pressurized fluid by way of pipe 26 to choke line 17 as shown in FIG. 2 while separate pump 32 is operatively connected to the interior of drilling string 8 and therefore interior of casing 10 by way of pipe 33 so as to control this internal pressurization to keep the internal pressure of casing 10 below the American Petroleum Institute burst rating for that casing.

It should be noted that this invention allows a packoff test at pressures even above the burst rating of the casing. Good oil field practice makes at least one test of replaceable tools at pressures at least equal to the rating of adjacent equipment. In the above example, by following this invention, the testing pressure reached 4500 psi even though the 13⅜ inch casing had a burst rating of 3450 psi. After a successful test in accordance with this invention an operator can be very confident that his packoff will hold under normal operating conditions.

Reasonable variations and modifications are possible within the scope of this disclosure without departing from the spirit and scope of this invention.

The embodiments of the invention in which an exclusive property or privilege is claimed are defined as follows:

1. A method for pressure testing a packoff between a casing hanger and an underwater wellhead wherein the casing supported by said casing hanger has a pressure rating above which said casing may collapse, said packoff sealing an annulus around the outside of said casing so that during pressure testing of said packoff if said packoff should leak said annulus around said casing will be pressurized and could possibly be pressurized beyond its collapse pressure, said casing having a drill string communicating with the interior thereof, the improvement comprising pressuring the interior of said casing through said drill string so as to maintain the differential pressure across said casing within said casing's collapse rating so that if said packoff does leak, the pressure buildup in said annulus around said casing will not exceed said casing's collapse rating, and during said interior pressurizing of said casing regulating the internal pressure of said casing so that such internal pressure does not exceed the burst rating of said casing.

2. Apparatus for pressure testing a packoff between a casing hanger and an underwater wellhead wherein the casing supported by said casing hanger has a pressure rating above which said casing may collapse, said packoff sealing an annulus around the outside of said casing so that during pressure testing of said packoff if said packoff should leak said annulus around said casing will be pressurized and could possibly be pressurized beyond its collapse pressure, said casing having a drill string communicating with the interior thereof, the improvement comprising first means for maintaining the pressure within said casing through said drill string so that if said packoff does leak, the pressure buildup in said annulus around said casing will not exceed said casing's collapse rating, and second means for regulating the internal pressure of said casing so that if the test tool seal does leak such internal pressure does not exceed the burst rating of said casing.

3. The apparatus according to claim 2 wherein said apparatus includes a test pump and pipes connected between said test pump and both said drill string and said packoff for pressuring up both said packoff and the interior of said casing by way of said drill string, and a pipe for transporting fluid returns from the interior of said drill string to a drilling fluid storage means, wherein said first means for maintaining the pressure within said casing so that the pressure buildup in said annulus around said casing will not exceed said casing's collapse rating is carried by at least one of said pipes connected between said test pump and both said drill string and packoff, and said second means for regulating the internal pressure of said casing so that such internal pressure does not exceed the burst rating of said casing is carried by said pipe for transporting fluid returns from the interior of said drill string to said drilling fluid storage means.

4. The apparatus according to claim 3 wherein said first means is a differential pressure regulator means carried by a pipe between said test pump and drill string, and said second means is a pressure regulator carried by said pipe for transporting fluid returns from the interior of said drill string to said drilling fluid storage means.

5. The apparatus according to claim 2 wherein said first means is a pump means operatively connected so as to pressurize only said packoff and said second means is a separate pump means operatively connected so as to pressurize only the interior of said casing through said drill string.

* * * * *